(No Model.)

N. J. FELIX.
FISHING REEL.

No. 469,687. Patented Mar. 1, 1892.

WITNESSES:
William Goebel
Fred. C. Riecker

INVENTOR
Numa J. Felix
BY George Cook
ATTORNEY.

UNITED STATES PATENT OFFICE.

NUMA J. FELIX, OF BROOKLYN, NEW YORK.

FISHING-REEL.

SPECIFICATION forming part of Letters Patent No. 469,687, dated March 1, 1892.

Application filed October 26, 1891. Serial No. 409,824. (No model.)

*To all whom it may concern:*

Be it known that I, NUMA J. FELIX, a citizen of the United States, and a resident of Brooklyn, in the county of Kings and State of New York, have invented certain new and useful Improvements in Wooden Reels for Fishing-Lines, of which the following is a specification.

My invention relates to an improvement in reels, and more particularly to the common form of wooden reels on which to wind hand fishing-lines.

In using the common form of reel for winding hand-lines it is the custom, after completely winding the line thereon, to either stick the point of the hook or hooks into the wood of which the reel is formed or to force the point of the hook between the strands of the line for the purpose of preventing the line from unwinding. Both of these resources, however, are objectionable, in that in the first instance there is always danger of breaking off the point of the hook, especially if the wood be hard, and in that in the second instance the method is ineffective, the hook often becoming disengaged, thereby allowing the line to unwind.

The object of my invention is to overcome these difficulties, and to provide a reel so constructed that the hooks may be partially embedded therein; and it consists of a wooden reel of any desired shape having secured thereon a piece, pieces, or strips of cork either at the sides or ends.

It further consists in certain novel features of construction, as will be hereinafter described, and pointed out in the claims.

Figure 1:
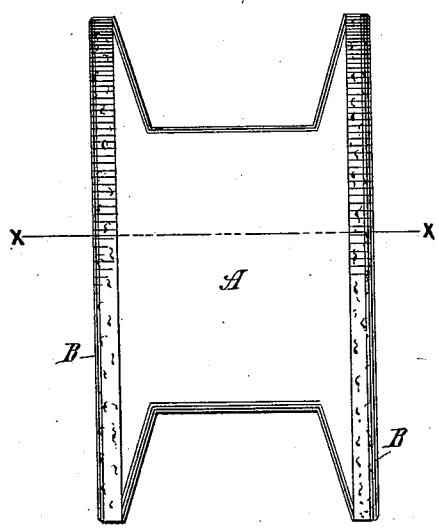
Figure 2:
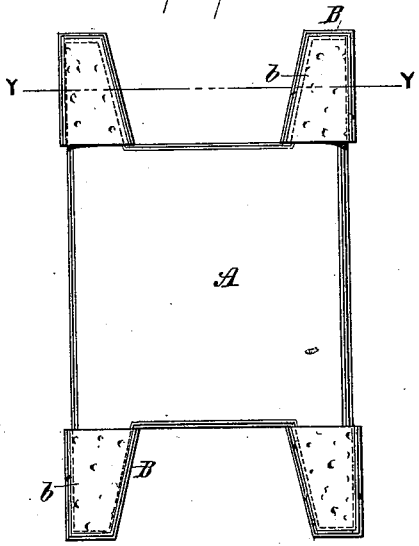
Figure 3:
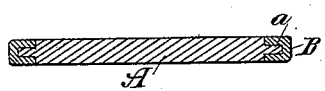
Figure 4:
Figure 5:
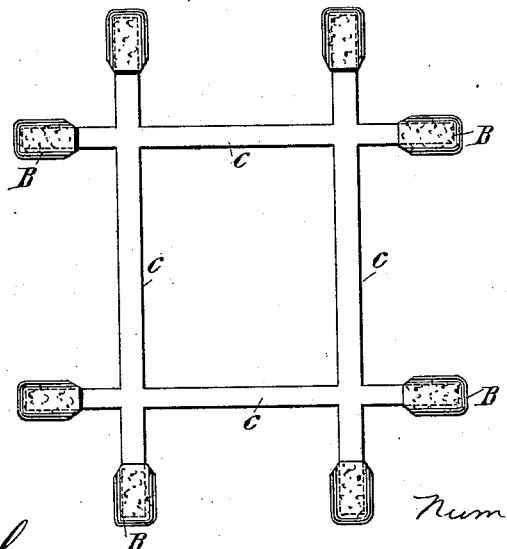

In the accompanying drawings, Figure 1 is a side view of my improved reel. Fig. 2 is a modification thereof. Fig. 3 is a sectional view taken on the line *x x* of Fig. 1. Fig. 4 is a similar view taken on the line *y y* of Fig. 2. Fig. 5 is a side view of another modified form of reel.

A represents a reel, preferably formed of thin wood and hollowed at the ends to prevent the line from sliding off after being wound thereon. The edges *a* of the reel are preferably cut away, as shown in Fig. 3, for the reception of the strips of cork B, mortised to receive the tenon formed on the reel and allow the sides thereof to fit flush with the sides of the reel.

If desired, the edge of the reel may be dovetailed or may be left square, these structures not being shown, as they are well understood. Before applying the strips of cork to the reel I prefer to apply an adhesive—such as glue or cement—thereto to assist it in adhering to the reel. Although I have shown in Fig. 1 strips of cork applied to both edges of the reel, it will of course be understood that it may be applied to one edge only; and, again, if preferred, may be applied at the point or points *b*, as shown in Fig. 2, the points being slightly cut away, as shown in Fig. 4, to receive them.

Instead of forming the reel in the form or of the shape shown in Figs. 1 and 2, it may be constructed of strips of wood *c*, secured together in the form of a frame, as shown in Fig. 5, in which instance one or more of the projecting ends will be cut away and the cork fitted and secured thereon. In each instance the cork will be made of such thickness to allow the end of the hook or hooks to be embedded to a sufficient depth to prevent them from becoming detached.

It will now be understood that my invention is exceedingly simple, can be produced at a small cost, and completely overcomes the objections urged against reels of the ordinary construction.

Having fully described my invention, what I claim as new, and desire to secure by Letters Patent, is—

1. A reel for holding fishing-lines, having secured thereto a strip or strips of cork overlapping the edge thereof.

2. A reel preferably constructed of wood and having its edges formed into tenons and fitted with mortised strips of cork cemented thereto, substantially as set forth.

Signed at New York, in the county of New York and State of New York, this 19th day of October, A. D. 1891.

NUMA J. FELIX.

Witnesses:
GEORGE COOK,
WILLIAM GOEBEL.